United States Patent [19]

Itoh

[11] Patent Number: 4,581,666
[45] Date of Patent: Apr. 8, 1986

[54] MECHANISM FOR FAST-FORWARDING/REWINDING OPERATION IN A TAPE PLAYER

[75] Inventor: Yukio Itoh, Tokyo, Japan

[73] Assignee: Clarion Co., Ltd., Tokyo, Japan

[21] Appl. No.: 379,425

[22] Filed: May 18, 1982

[30] Foreign Application Priority Data

May 20, 1981 [JP] Japan ................................. 56-74893
May 20, 1981 [JP] Japan ................................. 56-74892

[51] Int. Cl.$^4$ ............................................. G11B 15/44
[52] U.S. Cl. ..................................... 360/96.4; 360/73; 360/137
[58] Field of Search .................... 360/73, 74.1, 88, 93, 360/96.1, 96.2, 96.3, 137, 104–105

[56] References Cited

U.S. PATENT DOCUMENTS

| 4,225,894 | 9/1980 | Fulukawa et al. | 360/137 |
| 4,360,846 | 11/1982 | Asai et al. | 360/137 |
| 4,495,535 | 1/1983 | Kohri et al. | 360/96.3 |

Primary Examiner—John H. Wolff
Assistant Examiner—David J. Severin
Attorney, Agent, or Firm—Flynn, Thiel, Boutell & Tanis

[57] ABSTRACT

A mechanism for fast-forwarding/rewinding operations in which an intermittent gear driven by a motor is used for actuating a control member for advancing and releasing one or more of a head, pinch roller and idler for tape reproduction against the force of an elastic member while a lock means can lock the control member in the reproducing mode, the locked condition by the lock means being released by operation of one or both of the operation levers for fast-forwarding and rewinding operations.

7 Claims, 22 Drawing Figures

FIG. I

MECHANISM FOR FAST-FORWARDING/REWINDING OPERATION IN A TAPE PLAYER

BACKGROUND OF THE INVENTION

1. Field of the Invention

This invention relates to a fast-forwarding and rewinding operational mechanism in a tape player and more particularly to improvements for reducing the force for initiating fast-forwarding and rewinding operation, simplifying its mechanism, reducing its size and weight, permitting easy operation and reducing production cost.

2. Description of the Prior Art

In a tape player, fast-forwarding and rewinding mechanisms are requisite. As to such mechanisms, there have conventionally been proposed and put into practice various methods. However, in a conventional tape player wherein a pinch roller, idler, head, etc. are arranged to automatically move to an operational position due to spring force upon insertion of a tape cassette, it is necessary to move them out of the operational position against the spring force for fast-forward and rewind modes. Therefore, a disadvantage is that a relatively large force is required for moving these parts. In this connection, there has been proposed an electro-magnetic plunger to reduce the operational force. However, in order to instantly bring the pinch roller, idler, head etc. into an operational condition, a considerably large force and large stroke are needed. Therefore, there are disadvantages in requiring an electromagnetic plunger large enough to satisfy this requirement and circuitry having a large capacity.

OBJECT OF THE INVENTION

It is therefore an object of the present invention to overcome the above-mentioned drawbacks in a conventional tape player by using an intermittent gear for controlling movement of the pinch roller, etc., operating the control member against the force of an elastic member and unlocking a lock means which locks the control member in a reproducing mode by utilizing one or both of the fast-forwarding and rewinding operational levers, and by providing an electromagnetic plunger for keeping the control member locked, and a sensing member which can be operated by the fast-forwarding or rewinding lever and has an operational portion for operating a switch for energizing or deenergizing the electromagnetic plunger to release the locked condition of the control member.

SUMMARY OF THE INVENTION

In accordance with the present invention, there is provided a mechanism for a fast-forwarding or rewinding operation in a tape player which comprises:
a motor;
an intermittent gear to be driven by said motor;
a tape reproducing mechanism;
a control member for setting said tape reproducing mechanism in a reproducing or non-reproducing mode;
an elastic member for applying a force in the non-reproducing direction to said control member;
a means for causing said intermittent gear to actuate said control member against the force of said elastic member;
a lock means for locking said control member in the reproducing mode;
operation levers for controlling fast-forwarding/rewinding operations; and
a release means for releasing the locked condition of said lock means by one or both of said operation levers.

DETAILED DESCRIPTION OF THE PREFERRED EMBODIMENTS

Figure 1:
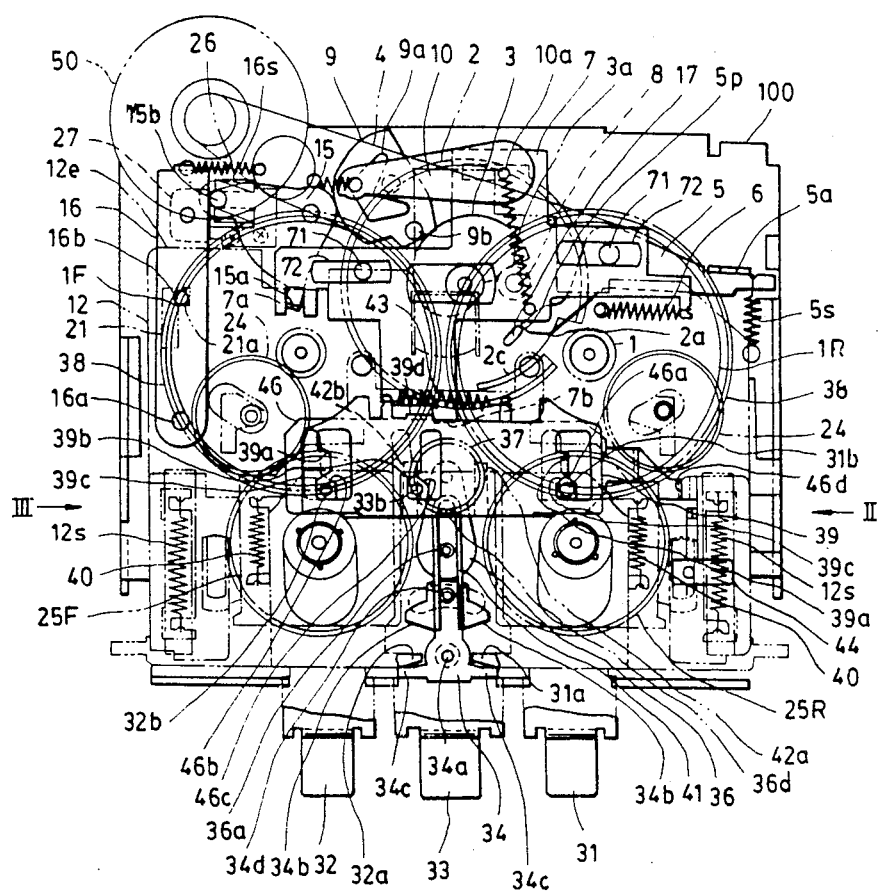
FIG. 1 is a plan view showing a tape player provided with a mechanism according to the present invention.
Figure 2:
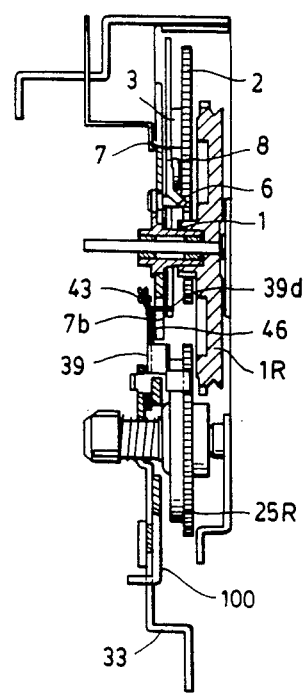
FIG. 2 is a side-view showing the tape player which is partially cut off along the axial line of the flywheel and capstan.
Figure 3:
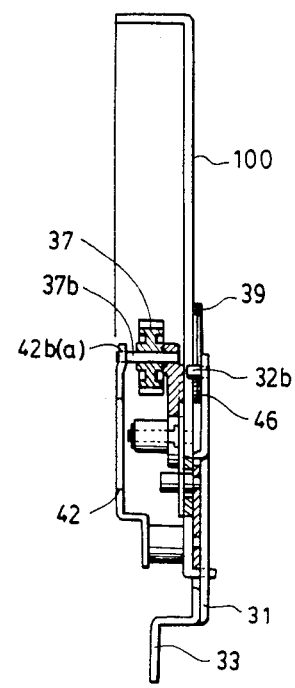
FIG. 3 is a side-view showing the tape player which is partially cut off along the idler gear portion.

With reference to the accompanying drawings showing the preferred embodiments of the present invention, FIG. 1 shows a control member 12 advanced to be in a play state, a belt 4 placed on a motor 50 provided in a side recess of a deck 100, a flywheel 1F and flywheel 1R driven by the belt 4 and installed at the bottom of the deck 100, a driving gear 1 formed integrally with the flywheel 1R as shown in FIG. 2, an intermittent gear 2 positioned on the lower side between the flywheels 1R and 1F and situated so as to be engageable with the driving gear 1, an intermittent or cut off portion 2a which can release at least the engagement of the gear 2 with the above-mentioned driving gear 1 and is formed on part of the gear 2, a cut-in 2c parallel with a circumferential gear train formed on one side of the gear 2 to be continuous from the cut-in bottom portion of the intermittent portion 2a, and the gear train, in the region where the cut-in 2c is formed, being provided with appropriate elasticity for smoothing the action of engagment with the above-mentioned driving gear. A cam portion 3 is formed coaxially and integrally with the intermittent gear 2, and an active member 7 is supported for movement parallel with the plate surface of the intermittent gear 2 with the gear 2 as a center. A spring 6 is provided between one end of the active member 7 and the deck, and the spring 6 allows the active member to slide leftward in FIG. 1 and gives the active member the energy for moving back. A roller, pin or similar piece 8 is provided on the lower face of the active member 7, and the piece 8 engages the face of the aforementioned cam portion 3 by means of the force of the spring 6 acting on the active member 7 as mentioned above, and the active member 7 moves by following the face of the cam portion 3.

The engaging portion 15a of a rotating link 15 which is pivotally supported on the deck 100 is engaged with the stopping portion 7a formed on the tip of the above-mentioned active member 7, and the piece 15b provided at the other end of the rotating link 15 can engage the receiving end 12e of the control member 12 when it is in a moved-back state and the active member 7 is moving rightwardly, so as to move the control member 12 against the force of a resetting spring 12s. The control member 12 is provided with a stop hole or slot 21 so that the control member 12 may be locked in its lower position by means of an engaging pin 16b provided in the middle of a locking member 16, the base end of which is pivotally supported at 16a on the deck 100.

The active member 7 mentioned above has guide holes 72 formed on both side portions as shown in the upper portion of FIG. 1, and pins 71 provided on the deck 100 are engaged with the guide holes 72, respectively. A locking member 5 has the middle portion revolvably supported by one of the pins 71 and is provided with a turning effort in the clockwise direction in FIG. 1 by means of a spring 5s at one end. The aforementioned intermittent gear 2 is provided with a projection 17, and the active end 5p of the locking member 5 is movable to a position engaging the projection 17, the projection 17 being formed at an angular position corresponding to the above-mentioned intermittent portion 2a. In a non-active state as shown in FIG. 1 in which the abovementioned driving gear 1 is positioned in the intermittent portion 2a, the aforementioned piece 8 is in touch with the stepped portion 3a of the cam 3 and is giving the cam a turning effort so as to rotate the intermittent gear 2 in the illustrated counterclockwise direction, but this turning is prevented by the active end 5p of the locking member 5 engaging the aforementioned projection 17.

As described before, the control member 12 is advanced by the rotating link 15 due to rightward motion of the active member 7, and then the control locking member 16 locks the stop portion 21 of the control member 12. The control locking member 16 is rotatable about a fulcrum 16a, and its moving end is provided with the core 27 of a holding plunger 26 and is energized in the holding direction by means of a spring 16s which is too weak to prevent upward movement by the spring 12s of the control member 12. As the control member 12 moves downwardly and the engaging pin 16b reaches the bent portion 21a of the slot, the energizing force of the spring 16s causes the control locking member 16 to move in the locking direction for having the core 27 touch the holding plunger 26 and be held by the holding plunger 26 which is in a state of being supplied with electric power. When the electric power supply to the holding plunger is turned off, the lock of the control member 12 is released because the core 27 is unable to be held by the force of the spring 16s; therefore, the control member moves upwardly.

The above-mentioned flywheel 1R and the other flywheel 1F provided opposite to the flywheel 1R rotate in directions opposite to each other as may be seen from the placement of the belt 4 from the motor pulley shown in FIG. 1. These flywheels 1R and 1F are associated with a first reel base 25R and second reel base 25F, respectively. Between these reel bases 25R and 25F is a gear idler 37 provided on the free-end of an interlocking member 36, and the operation of the interlocking member 36 causes the idler 37 to be simultaneously engaged with or disengaged from the circumferential gear portion 38 of one of the aforementioned flywheels 1R and 1F and the circumferential gear of a respective one of the reel bases 25R and 25F, whereby a fast-forwarding or rewinding operation is effected. The engagement of the idler 37 with the flywheel and engagement with the associated reel base take place with some time difference between them; therefore, the engagement with the circumferential gear portion 38 of the flywheel precedes, and the engagement with the reel base gear portion follows thereafter. By this means, the idler 37 first rotates, and the reel base is positively rotated as the engagement with the stationary reel base takes place while the idler is rotating. This prevents a rotation disabled state from being produced between the gear tips of the idler 37 and the reel base by engagement of the idler and reel base when both are at a stop. Two operation levers 31 and 32 for controlling fast-forwarding and rewinding (each of the operation levers working either for fast forwarding or rewinding depending on the tape running direction and having as its identification marking an arrow or similar symbol simply denoting the direction of tape run) are provided on both sides of a release lever 33 on the front of the deck 100. These fast-forwarding and rewinding levers 31 and 32 are each provided with a spring 40, and are normally urged downwardly. Each of the operation levers 31 and 32 is provided with an operating portion 31a or 32a, and an idler control member 34 is rotatably supported on a pivot 34a between the operating portions 31a and 32a. The member 34 is provided with receiving portions 34b and 34b and receiving portions 34c and 34c on the bottom and sides, respectively, which can be engaged by the above-mentioned operating portions 31a and 32a. As either one of the operation levers 31 and 32 is depressed, it acts on one of the receiving portions 34b and tilts the member 34. The returning motion of the depressed operation lever acts on one of the receiving portions 34c to return and restrict the member 34 to the illustrated neutral state. A U-shaped resilient member 41 is provided between the member 34 and the aforementioned interlocking member 36. The member 41 is fitted over a projection 34d provided on the tip of the member 34, the pivot 36a of the interlocking member 36 and a projection 36d provided on the tip of the interlocking member 36. When the member 34 pivots and returns, the interlocking member 36 simultaneously tilts and returns, and the tilt angle of the interlocking member 36 is limited by stop claws 42a and 42b provided on both sides of the interlocking member for thereby optimizing the engagement of the above-mentioned idler gear 37. These stop claws 42a and 42b are bent to be appropriately adjusted so as to make the limiting condition suitable. The resilient member 41 provides a suitable cushion effect at the time when the idler gear 37 engages with the gear portions of the flywheel and reel base, preventing the gear tooth tips from being possibly damaged in case the gear and the gear portions engage each other as rigid bodies, suppressing the vibration due to the rotating operation, and letting the gear and the gear portions engage each other with an active force which overcomes the repulsion at the time when the simultaneously rotating gears mutually engage each other. At the time of their disengagement, the member 41 causes the interlocking member 36 to return to the intermediate position as a result of being interlocked with the member 34.

The aforementioned fast-forwarding and rewinding operation levers 31 and 32 are provided with pin- or roller-shaped engaging portions 31b and 32b in their respective tip portions, and these engaging portions 31b and 32b are associated with locking portions 39a and 39a, respectively, of a control locking member 39. When either operation lever is depressed, the engaging portion is locked by the associated locking portion for holding the fast-forwarding or rewinding state. The aforementioned control locking member 39 for the operation levers 31 and 32 is provided with a release cam portion 39b which touches an engaging portion 33b at the tip portion of the release lever 33 provided between the operation levers 31 and 32, and the operation levers 31 and 32 are released from the locked state by depressing the release lever 33. On the upper side of the aforementioned locking portions 39a and 39a, a release cam portion 39c is formed; therefore, in case either one of the operation levers 31 and 32 is operated while the other is in the locked state, the engaging portion (31b or 32b) of the operated lever first acts on the release cam portion 39c to release the other locked lever from the locked state, and is itself thereafter locked.

A sensing member 46 is provided as superimposed on the control locking member 39 for directly or indirectly releasing the aforementioned control member 12 from its locked condition, and is provided with contacting portions 46a, 46b and 46c corresponding to the engaging portions 31b, 32b and 33b of the aforementioned levers 31 to 33. On one side of the sensing member 46, an operating portion 46d is formed to cooperate with a release switch 44, and a spring 43 is provided between the sensing member 46 and control locking member 39. The switch 44 controls the plunger 26 which is provided for locking the control member. In an alternative embodiment (FIG. 7), the sensing member 46 does not effect the lock-holding of the control member by means of the plunger 26, etc. instead direct locking of the control member 12 is provided, and the release of the head, pinch roller and idler is effected by letting the sensing member 46 be actuated by such operations as fast-forwarding, rewinding, stop, eject, etc. In this case, part of the sensing member 46 is provided with an engaging portion 46e as shown in FIGS. 7 and 8(a) to (c), and a stopping portion 12a is formed on the control member 12, so that the engaging portion 46e may lock the stopping portion 12a at the position to which the control member 12 has advanced.

On the lower side of the aforementioned active member 7, an active portion 7b is provided. The active portion 7b is opposed to a projection 39d of the control locking member 39, and when the locking of the projection 17 of the previously described intermittent gear 2 and the locking member 5 is released and the active member 7 causes the driving gear 1 to engage and drive the intermittent gear 2, the projection 39d and active portion 7b touch each other to supplement the force which is provided by the spring 6 go the active member 7 so as to move the control locking member 39 to a release position against the force which is provided by the aforementioned spring 43.

Release of the locking member 5 is done by letting a plunger (not illustrated) which is actuated by means of a tape end, cassette pack insertion or program changeover act on an operating portion 5a formed at a position near a spring 5s as shown in FIG. 1. In not-illustrated alternative embodiments, the member 5 can be released by letting a program changeover lever which operates against the tensile strength of the spring 5s act on the operating portion 5a; or by letting an eccentric cam coaxially provided with the reel base act on a sensing lever and by providing an active force from an active piece via frictional force due to revolution of the reel base in a direction opposite to that of the active force produced by the above-mentioned eccentric cam so that a mechanical detection mechanism, which causes the sensing lever to slide in the axial direction by letting a stepped portion formed on the eccentric cam stop at the engaging portion of the sensing lever when the active force due to the active piece ceases, may act on the operating portion 5a; or by using as appropriate such a detecting means as utilizes the tape tension.

Locking of the control member 12 by means of the aforementioned control locking member 16 and its release may alternatively be provided not by using the control locking member 16 but by providing the control member 12 with a core corresponding to a magnetically attractive plunger provided on the deck for letting the attractive plunger lock the control member 12 in the state of having been advanced by the action of the rotating link 15, and releasing this locking by having the electric power supply to the plunger turned off.

Figure 9:
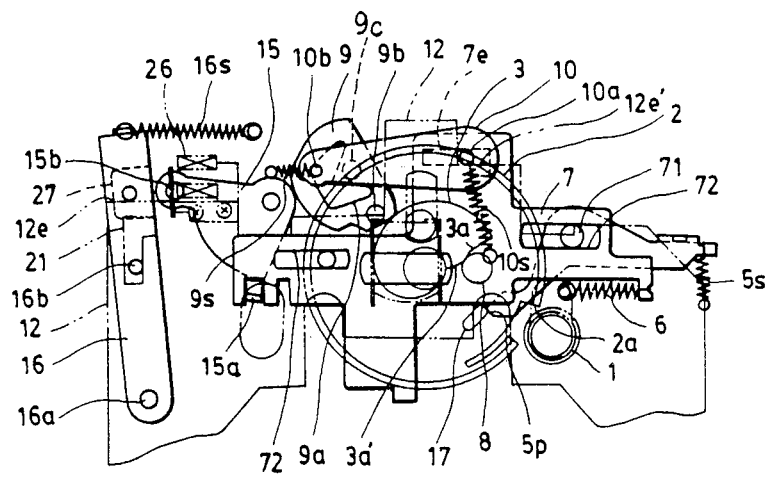
FIGS. 9 to 12 are fragmentary plan views showing respective states of a control member being actuated by an active member of the system of FIG. 1.
Figure 10:
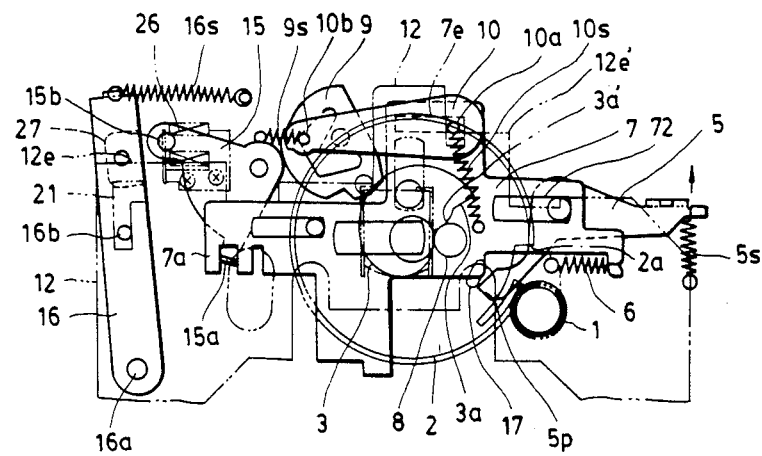

The embodiment according to the present invention described above operates as described below. While, as shown in FIG. 9, the active end 5p of the locking member 5 is normally in a stopped state engaging the projection 17 of the intermittent gear 2, if the locking member 5 is actuated with respect to the operating portion 5a against the action of the spring 5s by insertion of a cassette, detection of a tape end or an operation for program changeover, the engagement of the ac tive end 5p and projection 17 is released. As this release causes the active force due to the spring 6 to act on the stepped portion 3a of the cam portion 3 through the piece 8 of the active member 7, the intermittent gear 2 is caused to rotate a little in the counterclockwise direction in FIG. 9, and the piece 8 of the active member 7 drops into the deepest or radially innermost portion of the cam portion 3. In the course of the piece 8 being dropped in to the deepest portion of the cam portion 3, since the section extending from the intermediate portion of the stepped portion 3a to the deepest portion of the cam portion 3 is formed as an arc-shaped portion 3a' as shown in the illustration, even when the cam portion 3 rotates in the counterclockwise direction from the state shown in FIG. 9, the pushing pressure (due to the spring 6) of the piece 8 acting in the horizontal direction in the illustration acts approximately evenly as a push-rotating force on the stepped portion 3a (whereas the rotation of the cam) portion 3 causes the rotational force produced by the piece 8 pushing on the cam portion to decrease rapidly in the case of the stepped portion 3a being flat), infallibly producing the state shown in FIG. 10. As the cam portion 3 and intermittent gear 2 are thus rotated a little in the counterclockwise direction, the tooth train on the partial circumference adjacent the cut-in 2c of the intermittent gear 2 is engaged with the driving gear 1. As the driving gear 1 is rotated by such a prime mover as a motor, the intermittent gear 2 is rotated, and the cam portion 3 rotates therewith; therefore, the pin 10a of the cam changeover member 10 reaches the bent corner portion of the j-shaped engaging hole 7e formed in the top portion of the active member 7. During the states shown in FIGS. 9 and 10, the stepped portion 12e of the control member 12 is covering the bent portion of the engaging hole 7e, and the pin 10a is, therefore, not dropped into the bent portion even by the action of the spring 10s. In other words, if the active member 7 moves while the control member 12 is in the moved-back state as shown in FIG. 9 or 10, the cam changeover member 10 is not moved by the active member 7. In the course of the state shown in FIG. 9 becoming that shown in FIG. 10, the piece 15b of the rotary link 15 connected to the active member 7 assumes the state of being separated from the receiving edge 12e of the control member 12; therefore, the control member 12 will not be moved until the active member 7 is thereafter caused by the cam portion 3 to move a little rightward (in the direction opposite to the direction of movement of the active member 7 as the piece 8 is dropped in to the deepest portion of the cam portion 3), and the piece 15b touches the receiving edge 12e again. In other words, the advancing action of the control member 12 lags a little behind the start of rightward movement of the active member 7.

Figure 11:
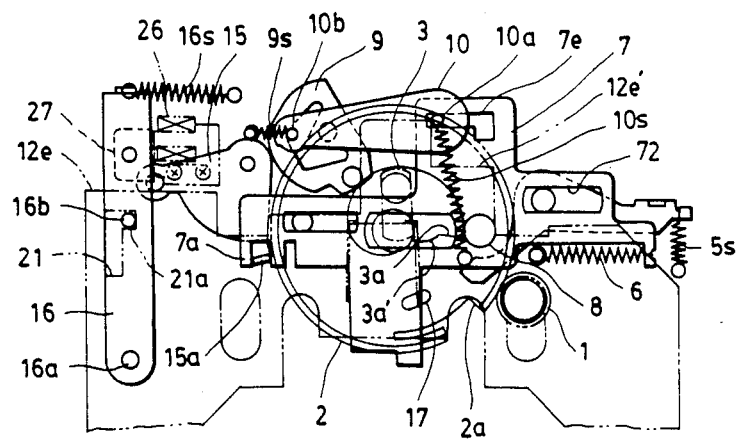
Figure 12:
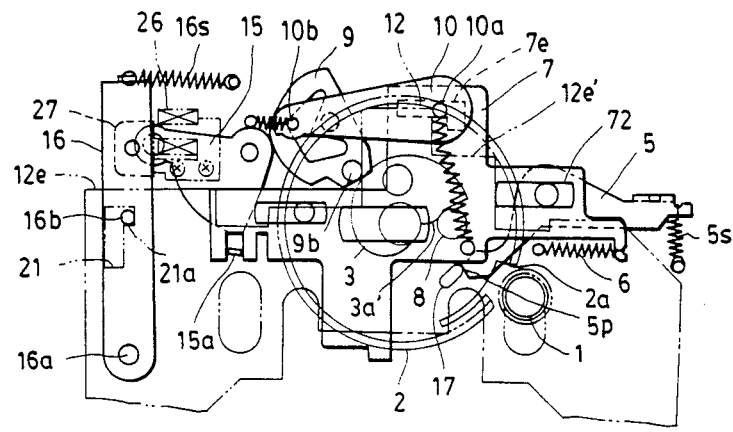
Figure 13:
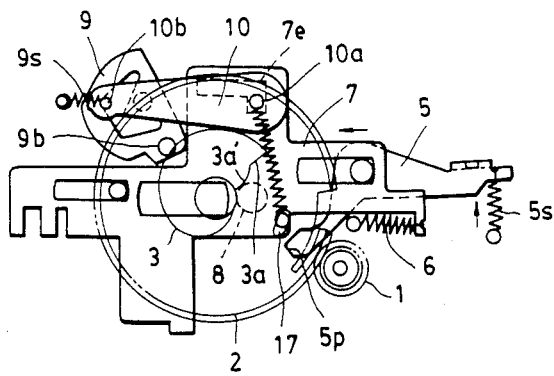
FIGS. 13 to 17 are fragmentary plan views showing various positions of a changeover cam and a cam changeover member for changing over the tape feeding direction by means of the active member, FIGS. 13 to 15 showing one of the tape feed direction changeover operations, and FIGS. 16 to 17 showing the other tape feed direction changeover operation.
Figure 14:
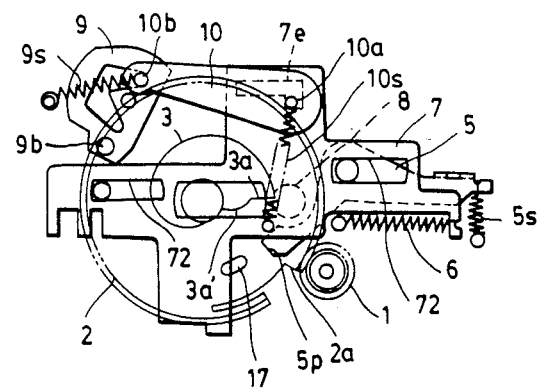
Figure 15:
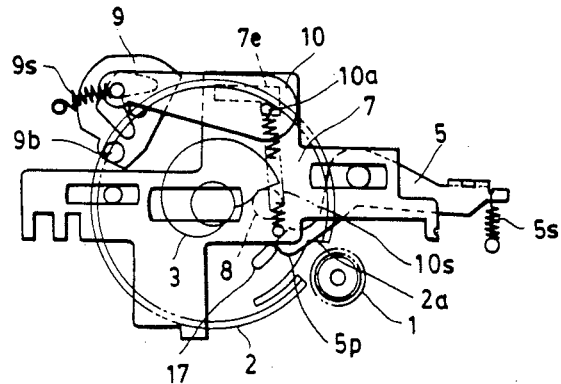

The control member 12 is moved by the rotary link 15 by means of the rightward movement of the active member 7, and the pin 16b of the locking member 16 engages the bent portion 21a of the stopping hole 21 to lock the control member as shown in FIG. 11, producing the play state as shown in FIG. 12. While the control member 12 is in the advanced, or play, state, its stepped portion 12e is spaced from the engaging hole 7e as shown in FIG. 12. If a release operation similar to that described above is given to the locking member 5 in this condition, the intermittent gear 2 rotates by being engaged with the driving gear 1 in the same manner as described before. In this case, however, the active member 7, from the state where the piece 8 is in touch with the middle of the stepped portion 3a of the cam portion 3 as shown in FIG. 9, is first slid temporarily in the direction shown with an arrow in FIG. 13 by the urging of the spring 6 to let the piece 8 be dropped in to the deepest portion of the cam face from the intermediate portion of the stepped portion 3a; therefore, the pin 10a having been at a stop in the state as shown in FIG. 9 is dropped into the bent portion of the engaging hole 7e by the action of the spring 10s as shown in FIG. 13. In other words, the cam changeover member 10 becomes engaged and locked with the active member 7. When the intermittent gear 2 and cam portion 3 are rotated while the cam changeover member 10 is engaged and locked with the active member 7 (for the play state), the active member 7 is caused by the cam face of the cam portion 3 to be slid rightwardly in the direction opposite to the direction of the arrow shown in FIG. 13. Therefore, a pin 10b in the cam changeover member 10 is caused to act on the angle cam 9a of a changeover cam 9 for operating the changeover cam 9 for reversing its position from the state shown in FIG. 13 to that shown in FIG. 14, followed by interruption of the engagement of the driving gear 1 and intermittent gear 2 and touching of the piece 8 to the middle of the stepped portion 3a as shown in FIG. 15. When the intermittent gear 2 is further rotated from the state shown in FIG. 15, the changeover cam 9 is changed over by being rotated in a direction opposite to that in the case of FIG. 14, namely from the state shown in FIG. 15 to that shown in FIG. 16, followed by the engagement of the driving gear 1 and intermittent gear 2 being interrupted when the piece 8 is in touch with the middle of the stepped portion 3a as shown in FIG. 17, and the operation stops. Thereafter, by each revolution of the intermittent gear 2 the changeover cam is alternately pivoted in clockwise and counterclockwise directions. As shown in FIG. 9 and thereafter; the changeover cam 9 is provided on the deck 100 to be rotatable by means of a pivot 9c, and a spring 9s is provided between the active piece or pin 10b of the cam changeover member 10 and the deck 100. The changeover cam 9 reverses the direction of tape movement according to a known technique. Although the changeover plate is not illustrated, the cam portions to change over the pinch rollers (not illustrated) provided on both sides of the head and the intermediate idler 24 to be engaged and disengaged between the driving gears 1 and reel bases 25R and 25F are formed so that the continuous tape feed according to an auto-reverse system can be realized by the aforementioned reverse changeover operation of the changeover cam 9 as shown in FIGS. 13 to 17, whereby a preferable tape recorder function is provided.

The control member 12 is provided for directly or indirectly effecting pressure-contacting release and control operation regarding the tape transport mechanism which includes the head, idler, pinch roller, etc.

Figure 16:
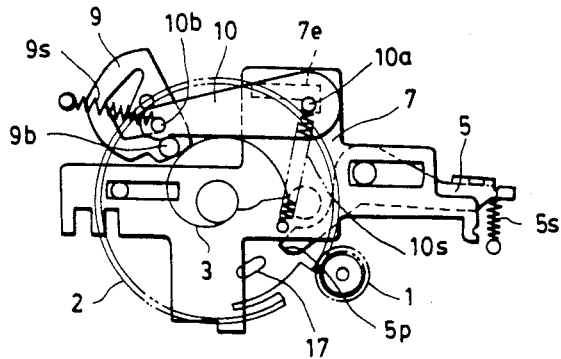
Figure 17:
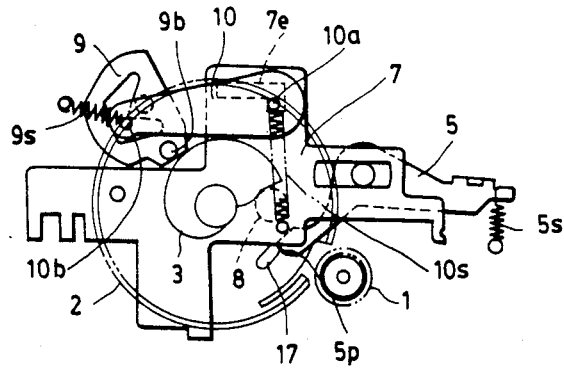

By dividing the cam portion 3 into two parts, especially by utilizing an intermediate stepped portion 3a (FIG. 9) in the non-active state when the intermittent gear 2 and driving gear 1 are disengaged each other, the action stroke of the active member 7 from the state as in FIG. 16 to the final state as in FIG. 13 through the state as in FIG. 17 is effected in a positive and orderly manner. By using one of the two parts for operating the head, pinch roller, idler and other pressure-contacting and for the auto-reverse mechanism operation as mentioned above, and by using the other part for initiating rotation of the intermittent gear 2 as well as effecting the connection with the channel changeover mechanism connecting member and the lock release of the fast-forwarding or rewinding operation lever, the changeover from the fast-forwarding or rewinding state to the playback state can be effected in a positive and orderly manner with one revolution of the intermittent gear. This is similarly applicable to the combination of channel changeover and head pressure-contacting.

Figure 4:
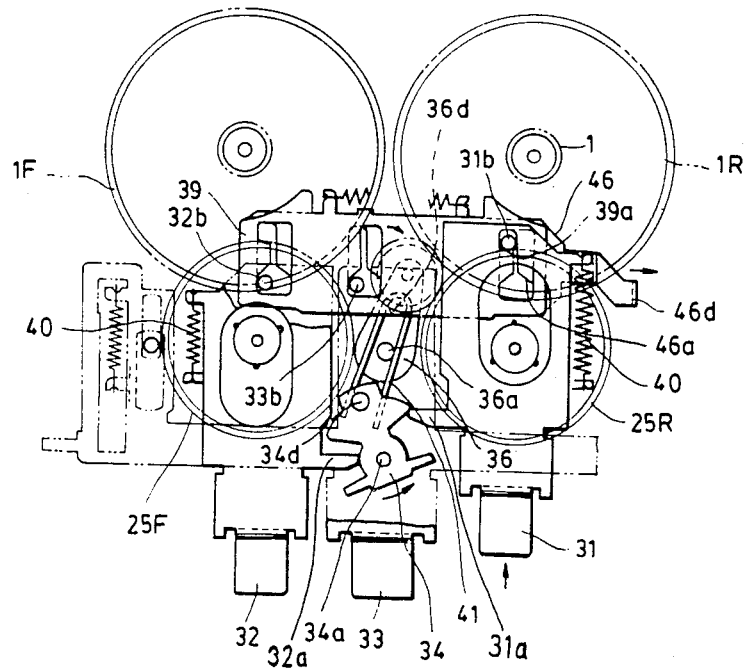
FIG. 4 is a fragmentary plan view showing the tape player in a fast-forwarding or rewinding state.

The operation of the preferred embodiment as described above will further be explained. As the aforementioned operation lever 31 is pushed in as shown in FIG. 4, its operating portion 31a causes the member 34 to rotate in the counterclockwise direction in FIG. 1, which causes the interlocking member 36 to be rotated clockwise via the resilient member 41. Then, the idler gear 37 is engaged with the gear 38 of the flywheel 1R and the gear portion of the reel base 25R for thereby driving the reel base 25R. On the other hand, the operation lever 31 is locked to the locking portion 39a of the control locking member 39 and is thereby held in the pushed-in state. Further, by means of the operation lever 31, the touching portion 46a of the sensing member 46 is pushed to let the operating portion 46d actuate the switch 44. The switch 44 is provided in the circuit to supply electric power to the plunger 26 provided for holding in an active state the control member which is provided for holding the mechanism of head, pinch roller, idler, etc. in the pressure-contacting state needed for playback, and the aforementioned actuation of the switch 44 causes the power supply circuit to be turned off to discontinue the power supply to the plunger 26 for thereby letting the above-mentioned playback mechanism move back from the playback state. What is described above is similarly applicable to the case in which the operation lever 32 is pushed in, with the exception of the tilting direction being reversed regarding the member 34 and interlocking member 36 and the pressure-touching direction of the idler gear 37 being reversed. In other words, the idler 37 is engaged with the gear 38 of the flywheel 1F and the gear of the reel base 25F for thereby driving the reel base 25F, and the operation lever 32 that is pushed in is locked to the locking portion 39a on the left side in the illustration.

Figure 7:
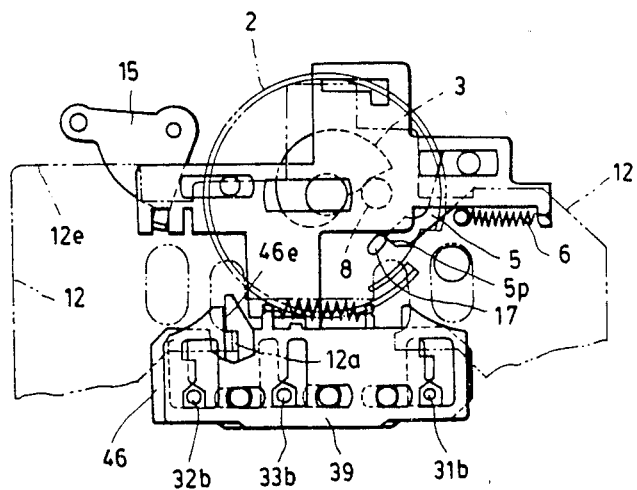
FIG. 7 is a fragmentary plan view showing the playback state of an alternative embodiment of the system of FIG. 1 in which a control member is locked directly by a sensing member.
Figures 8A, 8B, 8C:
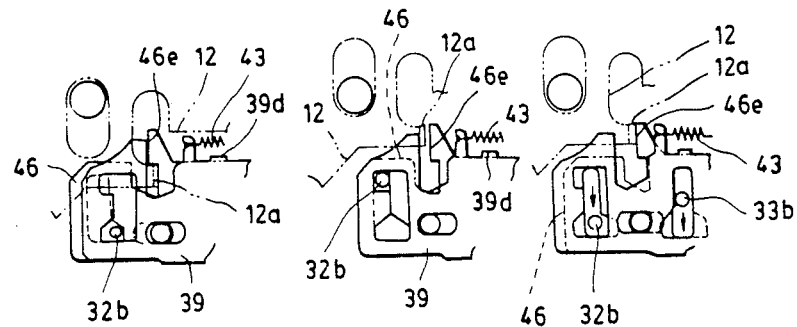
FIG. 8 (a), 8 (b) and 8 (c) are fragmentary plan views showing various operating states of the system of FIG. 7, FIG. 8 (a) showing the system in a playback state, FIG. 8 (b) showing the system in a fast-forwarding or rewinding operation, and FIG. 8 (c) showing the system in the state of being released by the operation of a release lever.

In case of the embodiment (FIG. 7) in which locking of the control member 12 is done directly by means of a sensing member 46 as shown in FIG. 7, when the operation lever 31 or 32 is operated during the playback state as in FIG. 7, the engaging portion 46e is released from the locked state as in FIG. 8(a) to the unlocked state as in FIG. 8(b) to let the control member 12 move back, and the operation lever 31 or 32 is locked by the corresponding locking portion 39a as shown in FIG. 1 for the locking member 39.

Figure 5:
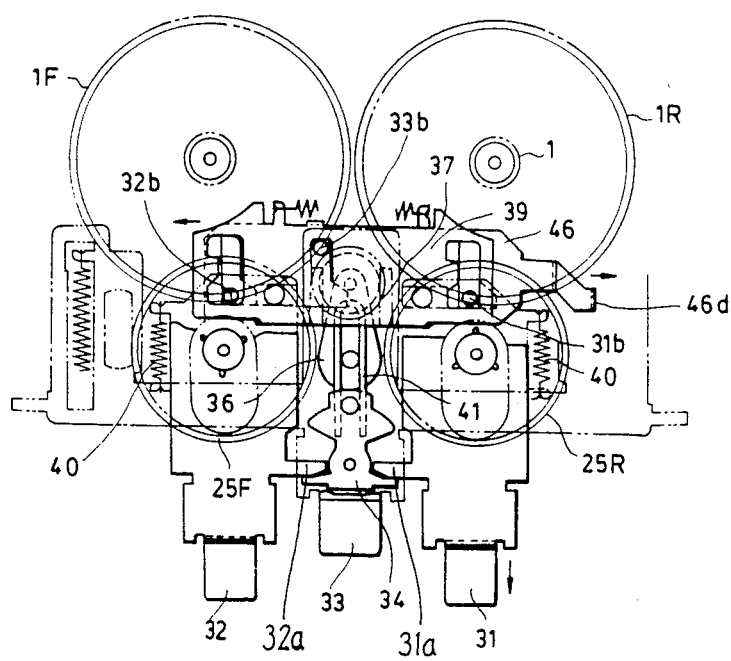
FIG. 5 is a fragmentary plan view showing the tape player in the state of being released by means of a release lever.

The operation lever 31 or 32 which is locked as described above is released from the locked state by pushing in the release lever 33 as shown in FIG. 5. That is, as the release lever 33 is pushed in during the state in which the operation lever 31 or 32 is locked by the corresponding locking portion 39a as described above, the engaging portion 33b of the release lever 33 engages with the release cam portion 39b of the control locking member 39 and slides the control locking member 39 leftward in the illustration; therefore, the operation lever 31 or 32 is released from being locked by the corresponding locking portion 39a. In case that either one of the operation levers 31 and 32 is pushed in while the other operation lever (32 or 31) is in the locked state, the locked operation lever is first unlocked in the same manner as described above.

Figure 6:
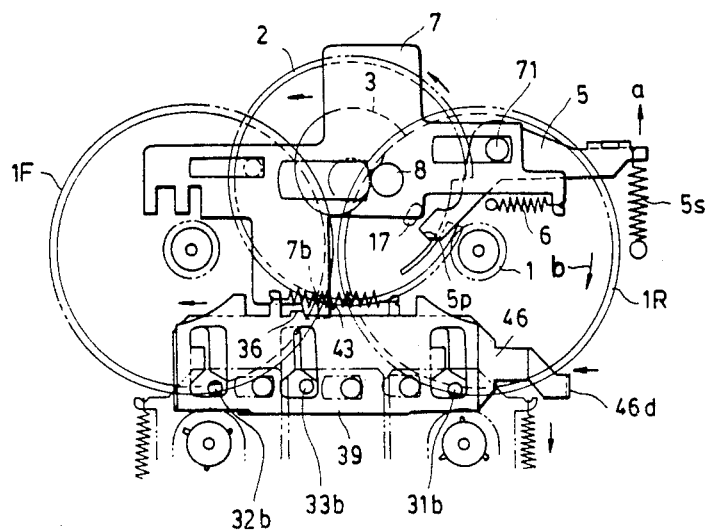
FIG. 6 is a fragmentary plan view showing the tape player in the state of being released as a cam rotates because of a tape-end detection or other cause.

By the tape end detection (such an operation as the mechanical action cue to a mechanical detection of the condition of tape tension upon arrival of a tape end or the action of an electromagnetic plunger upon detection of the stop of reel base rotation at a tape end by means of a detector circuit) in the fast-forwarding or rewinding state, the aforementioned locking member 5 is rotated about a pin 71 as shown with an arrow "a" in FIG. 6 against the active force of the spring 5s, the engagement of the projection 17 and active edge 5p is released to let the intermittent gear rotate, the intermittent gear 2 and driving gear 1 engage each other as in FIG. 6 to cause the intermittent gear 2 to be rotated by the revolution of the flywheel 1R which rotates as shown with an arrow "b" in FIG. 6, the active portion 7b of the active member 7 acts on the projection 39d of the control locking member 39 for thereby sliding the control locking member 39 leftward, and the operation lever 31 or 32 that has been locked is released from the locked state as in FIG. 6. Simultaneously with these actions, the sensing member 46 is reset to place the control member, which is provided for holding the head, pinch roller, etc. in the playback state, in the release state. Further, as the intermittent gear 2 rotates, the above-mentioned control member is advanced to move the head, pinch roller, idler, etc. to the playback state.

By dividing the action stroke of the active member 7, due to the aforementioned cam 3 which is integrally provided with the intermittent gear 2, into two parts separated by the non-active state in which the intermittent gear 2 and driving gear 1 are disengaged from each other, by offering one of the two parts for the pressure-contacting operation of the above-mentioned head, pinch roller, idler, etc. and for operating an auto-reverse changeover mechanism, and by offering the other part for initiating rotation of the intermittent gear 2 as well as for effecting connection with a channel changeover mechanism connecting member and the lock release of the fast-forwarding or rewinding operation lever, the changeover from the fast-forwarding or rewinding state to the playback state can be effected in a positive and orderly manner with one revolution of the intermittent gear. This can similarly be done regarding the combination of channel changeover and head pressure-contacting as well.

According to the present invention, regarding the changeover of the idler 37 between the reel bases 25F and 25R, an embodiment (FIG. 21) can be provided by using two idlers 37a and 37b which touch each other as shown in FIG. 21 and by using one flywheel 1C. By providing the changeover operations as shown with the solid and broken lines in FIG. 21, the turning effort from the single flywheel 1C can be transmitted to the reel base 25F or 25R by means of the idler 37b alone in case of the solid line and by means of both idlers 37a and 37b in case of the broken line.

Figure 18:
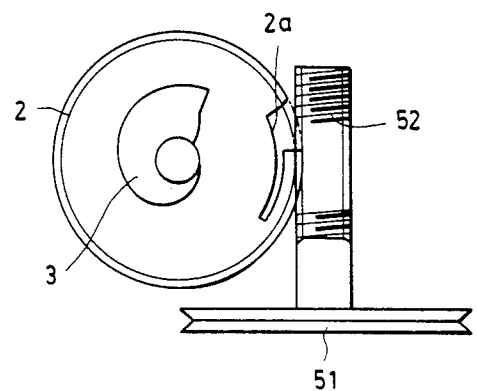
FIG. 18 is a partial plan view showing a modified embodiment of the intermittent gear driving system.
Figure 19:
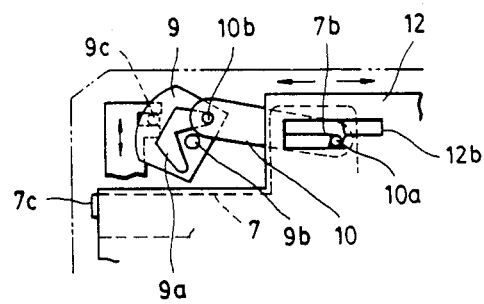
FIG. 19 is a fragmentary plan view showing a modified embodiment of the active member and the control member.
Figure 20:
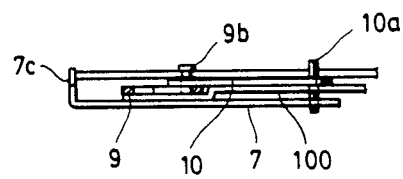
FIG. 20 is a fragmentary side-view showing the embodiment of FIG. 19.

In the case of the preferred embodiment described above, drive of the intermittent gear is provided by means of the driving gear which is provided integrally with the flywheel; however, the drive of the intermittent gear 2 may alternatively be provided by using as appropriate a pulley as shown in FIG. 18. By forming a worm 52 coaxially with the pulley 51 to be driven by a motor 50 as described before and by orienting the intermittent gear 2 relative to the worm 52 as shown in FIG. 18, an action similar to that described previously can be provided while the structure other then the above remains similar to that described before. By using the worm 52 as above, smaller dimensions and a higher reduction ratio can be provided. Also, the actuation of the control member 12 by means of the active member 7 may be provided as shown in FIGS. 19 and 20, without using the link 15. By omitting the rotary link 15 shown in FIGS. 1 or 7, providing the active member 7 with a projection 7c for letting it directly push the end portion of the control member 12, forming a separating opening 12b in the control member 12 and a J-shaped hole 7b in the active member 7, letting these engage with the pin 10a of the cam changeover member 10 and letting the active piece 10b of the cam changeover member 10 engage with the changeover cam hole 9a in the cam body 9, the cam body is rotated.

According to the present invention as described above, since the control means for controlling movement of the head, pinch roller, idler, etc. is operated by the intermittent gear driven by a motor against a release spring force and since the lock means is released from its locking condition by the fast-forwarding or rewinding operational lever, operability of the tape player is extremely improved, permitting operation with a small force and immediate realization of fast-forwarding or rewinding mode from the other mode simply by handling only the fast-forwarding or rewinding operational lever. Besides this, since a motor is used for obtaining force for moving the head, etc., a large manual force is not required for releasing the locked condition of the control member, which means that a plunger for producing large energy and circuitry for such a large plunger are not needed, resulting in miniaturization and simplification of the mechanism in general. This means that a plunger, if used for controlling movement of the control member may be small and of a lower electric current-type. Therefore, this is an invention with large industrial advantages such as reduction of cost and improvement of operability. Further, according to the preferred embodiments where the electromagnetic plunger is used for locking the control member and the sensing member to be operated by the fast-forwarding or rewinding operational lever is provided with the operational portion for energizing and deenergizing the electromagnetic plunger, the sensing member can properly lock the operational condition of each lever to thereby energize or deenergize the electromagnetic plunger. At the same time, since the locked condition of the control member can be controlled simply by a switching operation, the operational levers can easily be handled.

The embodiments of the invention in which an exclusive property or privilege is claimed are defined as follows:

1. A tape player which comprises:
   a motor;
   a rotatably supported driving gear which is rotatably driven by said motor;
   a rotatably supported intermittent gear having teeth which can engage and be driven by teeth on said driving gear, a portion of said teeth of said intermittent gear being cut off in order to interrupt operative engagement of said intermittent gear and said driving gear;
   a control member supported for movement between first and second position, wherein when said control member is in said second position said tape player is in a tape playing mode;
   resilient means for yieldably urging said control member toward its first position;
   a movably supported active member, means for effecting movement of said active member in response to rotation of said intermittent gear, and means for effecting movement of said control member toward its second position against the urging of said resilient means in response to movement of said active member;
   lock means for releasably locking said control member in its second position;
   first and second operation levers which are each supported for movement between first and second positions, wherein when said first and second operation levers are respectively in their second positions said tape player is placed in fastforward and rewind modes;
   a sensing member supported for movement between first and second positions and means directly mechanically coupling said operation levers and said sensing member for effecting movement of said sensing member to its second position in response to movement of one of said operation levers to its second position, and
   release means responsive to movement of said sensing member to its second position for causing said locking means to release said control member, said resilient means then returning said control member to its first position.

2. The tape player according to claim 1, wherein said lock means includes an electromagnetic plunger and means for holding said control member in said second position when said plunger is energized, and wherein said release means includes switch means for electrically energizing and de-energizing said plunger and means on said sensing member engageable with said switch means for causing said switch means to energize and de-energize said plunger when said sensing member is respectively in its first and second positions.

3. The tape player according to claim 1, wherein said means for mechanically coupling said operation levers and said sensing member includes said operation levers being movable parallel to a direction and said sensing member being movable transversely of said direction, and includes an engaging portion formed on each said operation lever and adapted to slidably engage contacting cam means provided on said sensing member; including a movably supported control locking member which, in an initial position thereof, can engage said engaging portion of and can releasably hold each said operation lever in its second position, movement of said control locking member away from its initial position effecting a release of each said operational lever when releasably held by said control locking member; and wherein said engaging portion provided on each said operation lever can slidably engage release cam means provided on said control locking member for causing said control locking member to move away from its initial position.

4. The tape player according to claim 3, wherein said control locking member moves approximately parallel to the directions of movement of said sensing member, and including resilient means for yieldably urging said sensing member and said control locking member in opposite directions relative to each other.

5. The tape player according to claim 1, including:
   rotatably supported first and second reel bases;
   resilient means yieldably urging each said operation lever toward its first position;
   a rotatably supported idler movable from an initial position to first and second positions in which it respectively drivingly engages said first and second reel bases;
   means for rotationally driving said idler so as to effect fast-forward and rewind movement of a tape when said idler is respectively drivingly engaged with said first and second reel bases;
   a movably supported idler control member and means for effecting movement of said idler between its initial position and its first and second positions in response to movement of said idler control member;

an engaging portion on said first operation lever which is cooperable with receiving means on said idler control member for effecting movement of said idler control member between two positions in which said idler is respectively in its initial and first positions when said first operation lever is respectively in its first and second positions; and an engaging portion on said second operation lever cooperable with receiving means on said idler control member for effecting movement of said idler control member between two positions in which said idler is respectively in its initial and second positions when said second operation lever is respectively in its first and second positions.

6. The tape player according to claim 5, wherein said means for effecting rotation of said idler includes flywheel means rotatably driven by said motor and drivingly coupled to said idler when said idler is in its first and second positions; and wherein said idler control member is positioned approximately between said reel bases.

7. The tape player according to claim 6, wherein said means for effecting movement of said idler in response to movement of said idler control member includes a movably supported interlocking member which has said idler rotatably supported thereon and which is operatively coupled to said idler control member by a resilient member.

* * * * *

UNITED STATES PATENT AND TRADEMARK OFFICE
CERTIFICATE OF CORRECTION

PATENT NO. : 4 581 666
DATED : April 8, 1986
INVENTOR(S) : Yukio ITO

It is certified that error appears in the above-identified patent and that said Letters Patent is hereby corrected as shown below:

On the title page; change the name of the inventor from "Yukio Itoh" to ---Yukio Ito---.

Signed and Sealed this

Twenty-sixth Day of August 1986

[SEAL]

Attest:

DONALD J. QUIGG

Attesting Officer

Commissioner of Patents and Trademarks